United States Patent [19]

Guglielmo

[11] Patent Number: 4,779,071

[45] Date of Patent: Oct. 18, 1988

[54] SYSTEM FOR TRANSMITTING COMMANDS

[75] Inventor: Alberto Guglielmo, Cascine Vica-Rivoli, Italy

[73] Assignee: Pianelli and Traveisa S.A.S., Italy

[21] Appl. No.: 942,753

[22] Filed: Dec. 17, 1986

[30] Foreign Application Priority Data

Dec. 20, 1985 [IL] Israel ............................ 68088 A/85

[51] Int. Cl.[4] ........................................ H04M 11/04

[52] U.S. Cl. ......................... 340/310 R; 340/310 A; 340/825.59

[58] Field of Search ........ 340/310 R, 310 A, 310 CP, 340/696, 538, 825.59, 825.7, 825.43, 825.39, 825.06; 375/37

[56] References Cited

U.S. PATENT DOCUMENTS 3,488,517 6/1970 Cowan et al. ........................ 307/3
4,328,482 5/1982 Belcher et al. ................. 340/310 A
4,556,865 12/1985 Fukagawa et al. ............ 340/310 A
4,569,045 2/1986 Schieble et al. ............... 340/310 A
4,638,299 1/1987 Campbell ....................... 340/310 A
4,639,714 1/1987 Crowe ........................... 340/310 A

FOREIGN PATENT DOCUMENTS 203276 2/1939 Switzerland .

OTHER PUBLICATIONS

Japanese Publication, Patent Abstract, vol. 2, No. 145, Dec. 4, 1978, p. 9092.

*Primary Examiner*—Donnie L. Crosland
*Attorney, Agent, or Firm*—Sughrue, Mion, Zinn, Macpeak, and Seas

[57] ABSTRACT

A system is described for transmitting a plurality of commands to peripheral means, particularly to motor-driven transport means and principally to automatic carriages on rails for the overhead conveyance of material, which provides a main station that generates and sends command signals to the peripheral means which house on-board reception and handling circuits for the command signals. The main characteristic lies in the fact that the plurality of commands is obtained through a coded signal formed from a sine wave which is sent to the peripheral means through a single conductor.

23 Claims, 4 Drawing Sheets

SYSTEM FOR TRANSMITTING COMMANDS

BACKGROUND OF THE INVENTION

The present invention relates to systems for the transmission of commands to peripheral means, particularly to motor-driven transport means and principally to automatic carriages on rails for the overhead conveyance of materials, wherein a main station is provided that generates and sends command signals to the peripheral means which house on-board receiving and handling circuits for the command signals.

Many methods and devices are known for the remote control of apparatus or machines driven by electric motors.

For example, in the field of materials handling in manufacturing industries, it is necessary to use methods and devices for the remote control of the functions inherent to the operations carried out by vehicles moved by electric motors, particularly those running on rails.

In these cases, several transmission lines (cables, rails, bus-bars) are often used which transmit the command signals generated by control apparatus located at a ground station to the self-propelled vehicle through sliding contact brushes.

One is dealing, for example, with commands for starting, changing from one speed to another, slowing, stopping, reversing, the carrying out of various operative functions by tools mounted on the motor-driven transport means themselves.

In the example of an application to self-propelled carriages on rails, the bus-bars are generally fixed to the core of the rail carrying it or to a flat strip or other support located above or the side of the rail, a common arrangement, for example, in cases in which the self-propelled vehicle is a bridge crane or other translatory machine.

When the number of commands to be transmitted is considerable, the number of conductors or bus-bars also increases. Difficulties are thus generated in the arrangement of the bus-bars, particularly in the case of the arrangement of the conductors on the core of the slide rail for an overhead self-propelled system where the conductors for supplying the drive motors of the individual carriages must also be housed.

In the case of self-propelled carriages on rails, the need has now been reached to arrange 7, 8, 9 and up to 10 bus-bars or the like, with the disadvantage that, because of the limited dimensions of the rail profile, it is necessary to limit the maximum number of bus-bars which can be housed and hence the number of commands which can be given.

Sometimes recourse is made to external auxiliary command lines if the functions to be controlled exceed those that can be controlled by the number of bus-bars which can be housed along the core of the rail and, moreover, attempts are made to produce extremely compact assemblies to the detriment of the ease of installation and maintenance.

If it were wished to use remote control systems with electromagnetic signals instead of bus-bars, however, it would be necessary to mount complex receiving circuits on the self-propelled carriages, while the system itself would also be exposed to the industrial environment where it would be prone to serious malfunctions because of the noise and electromagnetic interference created by the other equipment in operation.

SUMMARY OF THE INVENTION

The present invention aims at overcoming the disadvantages of the prior art, particularly to enable the sending of a plurality of command signals without the need to use an individual bus-bar for each command.

Therefore, the object of the invention is to provide means for the transmission of commands to motor-driven transport means which is simple, efficient and easy to install.

Hence, in order to achieve these objects, the present invention provides a system for the transmission of a plurality of commands to peripheral means, particularly motor-driven transport means and principally automatic carriages on rails for the overhead conveyance of materials, which provides a main station that generates and sends command signals to the peripheral means which house on-board circuits for receiving and handling the command signals, characterised in that the plurality of commands is obtained by a coded signal formed from a sine wave which is sent to the peripheral means through a single conductor.

BRIEF DESCRIPTION OF THE DRAWINGS

Further objects and advantages of the present invention will become clear from the detailed description which follows and from the appended drawings provided purely by way of non-limiting example, in which.

DETAILED DESCRIPTION OF THE PREFERRED EMBODIMENT

Figure 1:
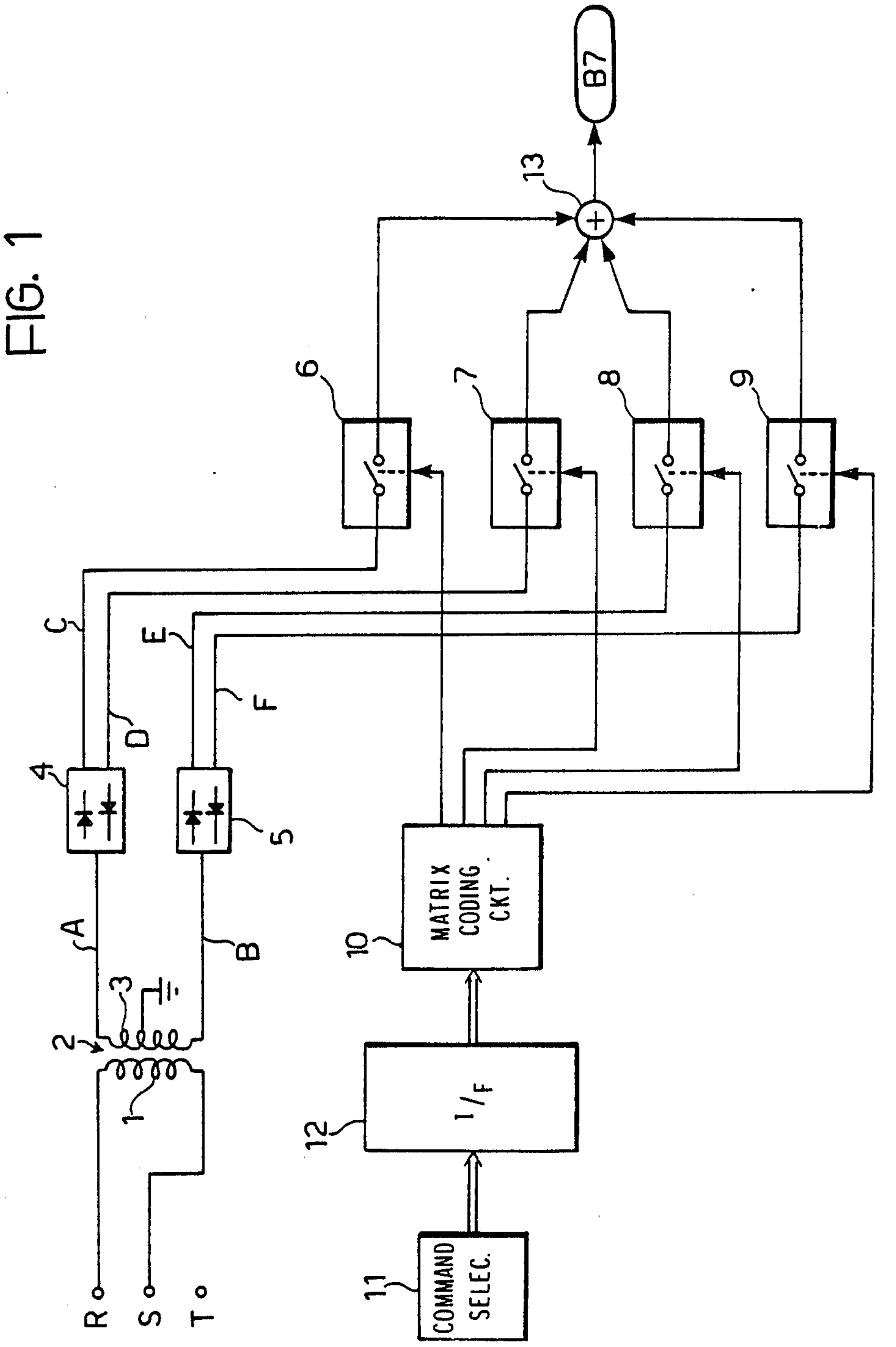
FIG. 1 shows part of the circuit which generates the command signals and is located in the ground station forming part of the system of the present invention.

In FIG. 1, which shows the application of the invention to the case of the transmission of commands used to control self-propelled vehicles which move on a rail, three input terminals for a three-phase supply voltage taken from the mains are indicated R, S and T.

Two phases of the mains voltage are supplied, across the terminals R and S, to the primary winding 1 of a transformer 2 which has a secondary winding 3 and a central earth outlet. The two ends of the secondary winding 3 are connected respectively to a first rectifier circuit 4 and a second rectifier circuit 5. Each of the two rectifier circuits 4 and 5 has two output terminals and contains two diodes arranged with inverse polarities so that the two outputs of each rectifier circuit comprise half-waves of the mains voltage with opposite polarities.

The four outputs of the two rectifier circuits 4 and 5 are fed respectively to the inputs of four switch circuits 6, 7, 8 and 9 which are controlled by four respective control signals from a matrix coding circuit 10 controlled by a command selection circuit 11 through an opto-insulated interface circuit 12.

The four outputs of the switches 6, 7, 8 and 9 are fed to an adding circuit 13 of the "OR" type, the output of which is fed to a command bus-bar B7.

Figure 2:
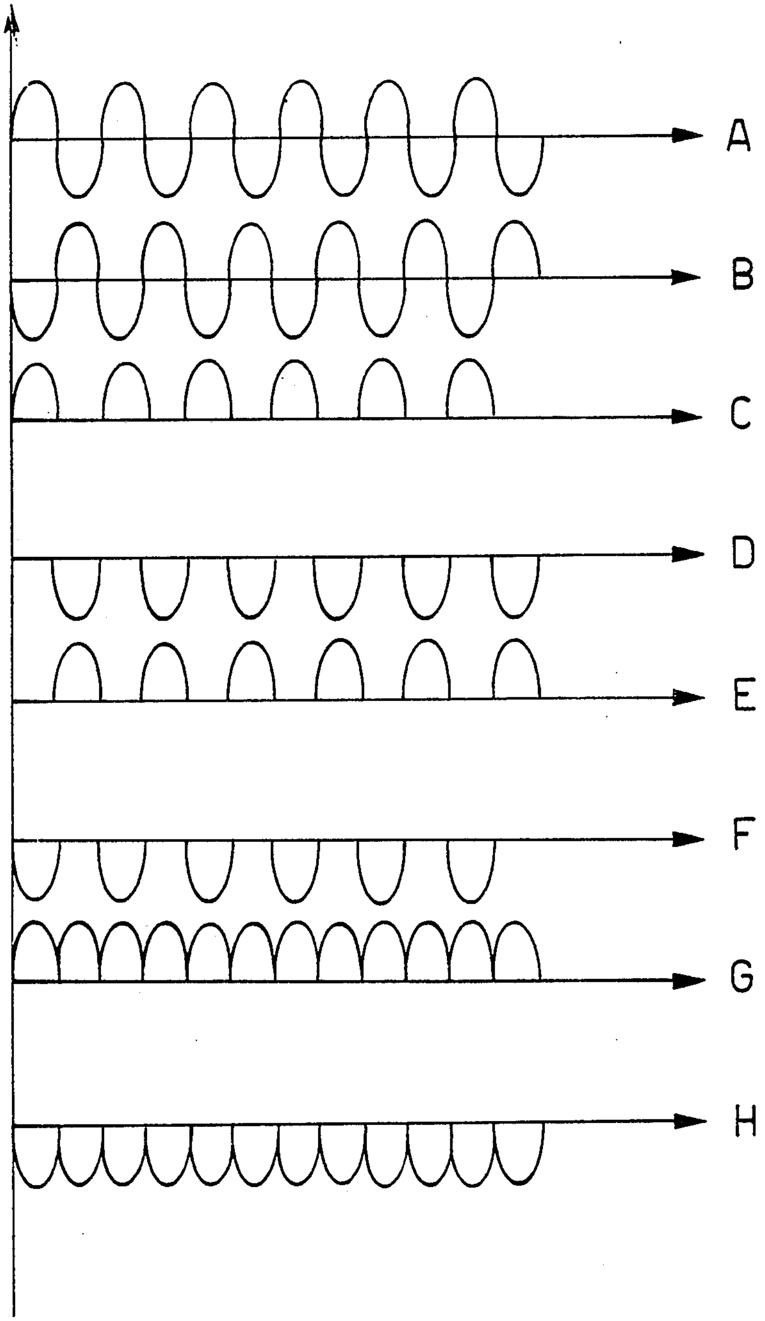
FIG. 2 shows the waveform of command signals which are used to control the functions of the transport means, in accordance with the present invention.

FIG. 2 shows the waveforms of command signals; those indicated A to F may occur at points of the circuit of FIG. 1 indicated by corresponding letters.

The waveforms indicated G and H are also command signals which can be created by the apparatus shown in FIG. 1.

Figure 3:
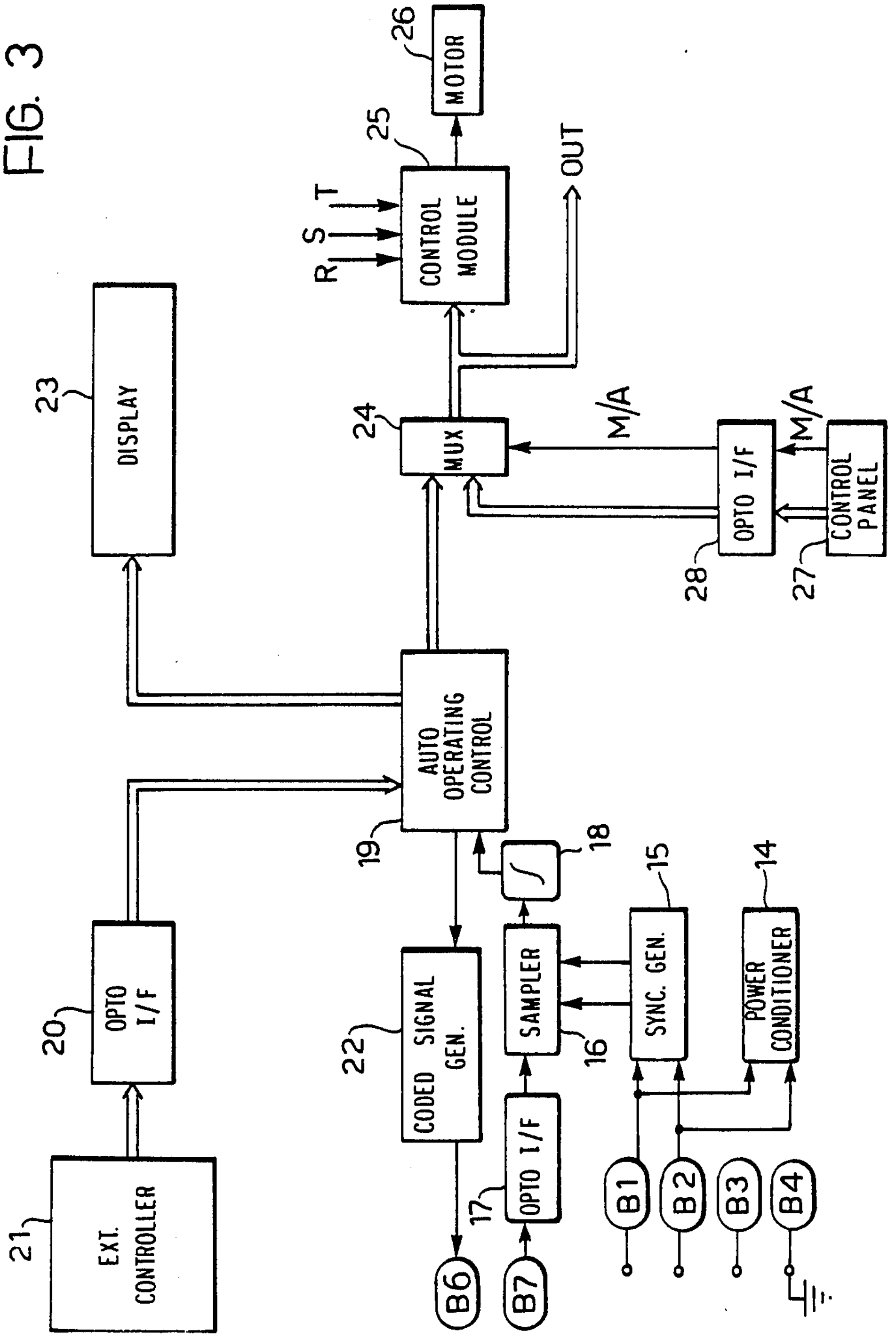
FIG. 3 is a block-schematic diagram of the circuit mounted on the transport means, in accordance with the present invention.

In FIG. 3, the power bus-bars which carry the power supplies to the transport means are indicated B1, B2, B3 and B4, while the bus-bar which carries the command signals generated by the ground station by means of the apparatus shown in FIG. 1 is indicated B7.

In the preferred embodiment, however, a bus-bar B6 carries control signals and signals of anomalous operation from the transport means to the ground station by the same method as that described for the transmission of the command signals from the ground station to the transport means.

The voltages present on the bus-bars B1 and B2 are used to create in a power conditioner 14 the various supply voltages for the electronic circuits present in the apparatus on the transport means.

The voltages present on the bus-bars B1 and B2 are also fed to the input of a mains synchronism generator circuit 15 which has two outputs supplying the control inputs of a sampling circuit 16.

The circuit details for the realisation of the mains synchronism generator 15 and the sampling circuit 16 will be shown later in FIG. 4.

The sampling circuit 16 has an input connected to an opto-insulated interface 17 which receives the command signals from the bus-bar B7. The output of the sampling circuit 16 is fed to a digital integrator 18 which enables the validation of a command signal only after it has received a predetermined number of half-waves and its cancellation only after it has received the same number with a different composition.

The signal output by the integrator 18 is supplied to an automatic operating control circuit 19 for the transport means. This circuit 19 oversees all the translation, actuation and working operations of the motor-driven transport means and typically may comprise a microprocessor.

The automatic operating control circuit 19 also receives input signals through an opto-insulated interface 20 from an external controller unit 21 which controls external control devices. These devices carry out, for example, the function of preventing collisions of the transport means, signalling states of emergency, an alarm for the opening of heat safety devices, etc.

The control circuit 19 therefore also has an output connected to a coded signal generator 22 for generating signals relative to the operating conditions of the apparatus, which is similar to that located at the ground station and shown in FIG. 1.

Another output of the control circuit 19 leads to a visual display device 23 for displaying the state of the apparatus.

A final output of the circuit 19 is fed to a multiplexer circuit 24 which converts the command signals into operating signals for a control module 25 of the motor 26. The control module 25 also receives the three three-phase voltages R, S and T necessary for supplying power to the transport means and for the operations it has to carry out.

In order to enable additional manual control of the transport means, a control panel 27 is also provided which outputs command signals to the circuit 24 through an opto-insulated interface 28.

The selection of the manual or automatic operation is effected by means of a signal indicated M/A in the drawings.

An OUT output is also available for supplying command signals to other peripheral units.

Figure 4:
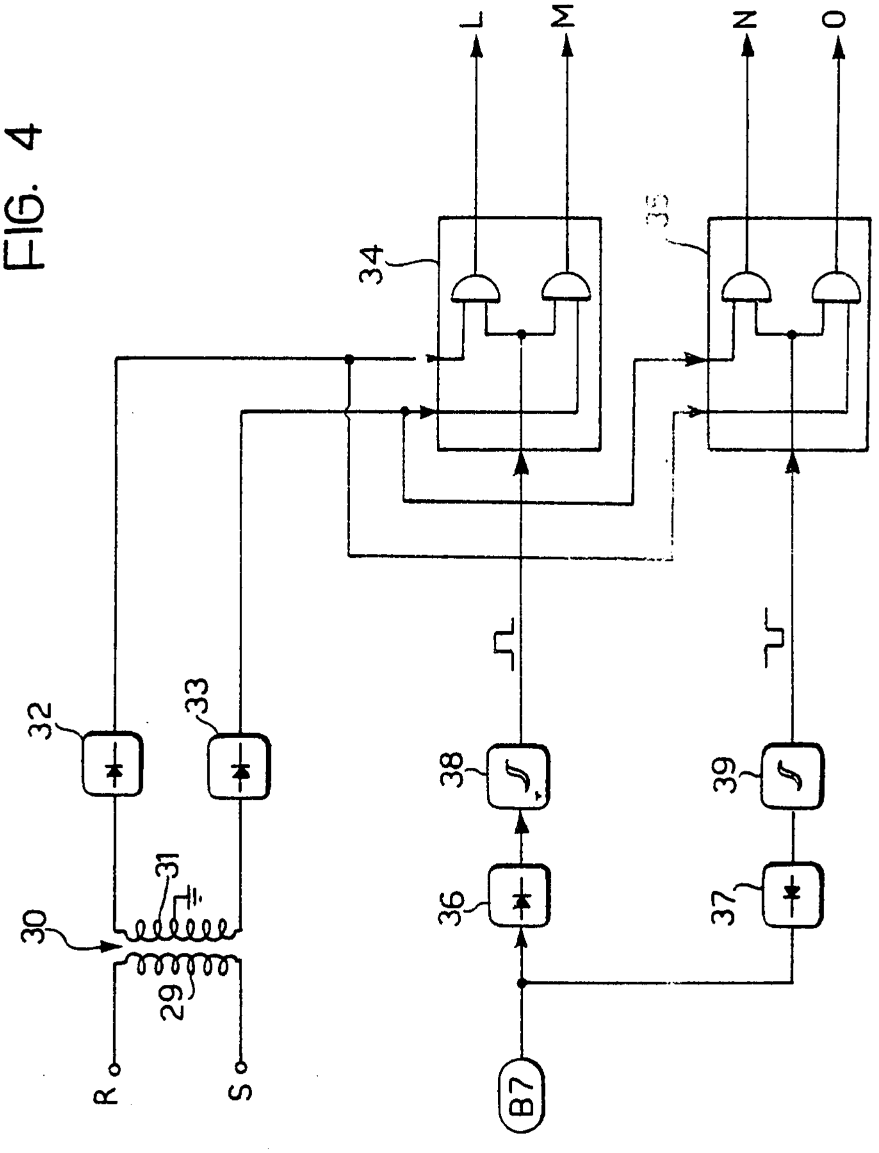
FIG. 4 shows part of the decoding circuit for the command signals mounted on the transport means, in accordance with the present invention.

In FIG. 4, a primary winding 29 is part of a transformer 30 which has a secondary winding 31 with a central earth tap. The two terminals of the secondary winding 31 are connected respectively to a first rectifier circuit 32 and a second rectifier circuit 33. The two rectifier circuits 31 and 32 are identical whereby the two outputs of the rectifier circuits comprise positive half-waves which are 180° out of phase with each other in that the rectifier circuits receive the balanced signals from the secondary winding 31 with the central earth tap.

Hence, the signals output by the two rectifier circuits 32 and 33, indicated U and V in the drawing, constitute synchronism signals derived from the voltage present on the bus-bars B1 and B2 and serve to define time periods associated with "positive phases" or "negative phases".

The signals U and V are then supplied to timing inputs of a first sampling circuit 34 and a second sampling circuit 35. The two sampling circuits 34 and 35 also receive the command signals to be decoded from the bus-bar B7, each through a respective rectifier circuit 36 and 37 and a squaring circuit 38 and 39. The two rectifier circuits 36 and 37 rectify respectively the positive half-waves and the negative half-waves contained in the command signals.

Within the sampling circuits 34 and 35 are two "AND" gates whose inputs receive both the synchronism signal from the synchronism generator circuit (15; 30, 32, 33) and the command signals to be decoded from the squaring circuits 38 and 39.

The outputs of the four AND gates constitute the outputs L, M, N, O of the sampling circuit and, according to the signal present at their terminals, may have the various command signals to be passed to the control circuit 19 of the transport means.

The operation of the system described is as follows. With the use of the means described above, the transmission of a plurality of commands to the transport means through a single conductor is made possible with the use of a suitably coded signal.

The code is generated at the ground station essentially through the rectifier circuits 4 and 5, the coding matrix (6, 7, 8, 9 and 10), and the adding circuit 13 (see FIG. 1).

More particularly, again with reference to the waveforms shown in FIG. 2, it is known that the outputs from the secondary winding 3 have the waveforms A and B which represent the mains voltage with opposite phases. The waveform A, which can be considered as having a "positive" phase gives rise to two waveforms C and D at the output of the rectifier circuit 4 which represent respectively the positive and negative positive-phase waveforms of the coded command signals.

Similarly, the waveform B represents the "negative" phase and the signals which this produces at the output of the rectifier circuit 5 are the positive and negative half-waves (E and F)—with a negative phase—of the coded command signal.

With these signals (C, D, E and F) present at the four inputs of the switches 6, 7, 8 and 9, it is possible to obtain all the eight waveforms shown in FIG. 2 at the output of the adding circuit 13 by the appropriate closure of the switches controlled by the matrix circuit 10.

It is thus possible to send eight different coded command signals on the bus-bar B7, corresponding to an equal number of functions which have to be carried out by the motor-driven transport means.

The operation of the control system on the transport means is explained in FIGS. 3 and 4.

The bus-bar B7 carries the coded command signals sent to the ground station. These may be in the form of one of the eight waveforms shown in FIG. 2. The sampling circuit 16 decodes them and, after the digital integrator 18 has confirmed their validity, feeds them to the control circuit 19 which is turn feeds them through the multiplexer 24 to the circuits which directly control the motor 26 of the transport means.

More particularly, the decoding of the command signals occurs as follows.

The main voltage present at the terminals R and S generates, through the balanced transformer 30 and the rectifier circuits 32 and 33, a series of positive half-waves which exist only at the respective instants corresponding respectively to the positive phases and to the negative phases, and thus act as period synchronism signals for the AND gates.

The signals output by the squaring circuit 38 are constituted solely by positive half-waves, whatever their time phase, while the signals output by the squaring circuit 39 are constituted solely by negative half-waves, whatever their time phase.

By combining the signals output by the squaring circuits 38 and 39 with those from the phase synchronism generator, the AND gates can repeat at their outputs L, M, N, O the eight combinations of command signals which are present on the bus-bar B7 from the ground station.

In other words, the signals output at the terminals L, M, N and O correspond to the eight waveforms shown in FIG. 2 in accordance with the following table.

| Wave-form | Output L | Output M | Output N | Output O |
|---|---|---|---|---|
| A | YES | NO | YES | NO |
| B | NO | YES | NO | YES |
| C | YES | NO | NO | NO |
| D | NO | NO | YES | NO |
| E | NO | YES | NO | NO |
| F | NO | NO | NO | YES |
| G | YES | YES | NO | NO |
| H | NO | NO | YES | YES |

Hence, the eight states of the outputs L, M, N and O constitute the decoded command signals which serve to control the transport means.

These means may also have an on-board generator 20, 21, 22 for signals of the operating conditions, which may be complete, like that which generates the eight ground command signals, but which may also be formed more economically with only two of the four switches 6, 7, 8 and 9 provided in the ground station.

In this case, the reduced circuit could generate three of the eight waveforms shown in FIG. 2 which will still be sufficient for diagnosis, that is, for indicating the presence, absence or anamalies or various signals, and transmitting this data to the ground station.

In this instance, it is necessary to add the bus-bar B6.

An anomaly may be any one of the following conditions occurring on the carriage: operation of emergency push-button, thermal switch open, actuation of anti-collision device.

It is also important that the entire system be manually controllable and hence the circuits 27 and 28 are provided for a manual control of the transport means.

From the description given the advantages of the method and apparatus for the transmission of commands, particularly to motor-driven transport means and principally to automatic carriages on rails for the overhead transport of material, which is the subject of the present invention are clear.

In particular, these are represented by the fact that it is possible to send a plurality of command signals without the need to use a single bus-bar for each command. Moreover, the means for the transmission of commands is simple and easy to install because of an appreciable reduction in bulk due to the elimination of supplementary external cables and a smaller number of parts, and consequently has greater reliability and lower plant costs.

Finally, it should be noted that an important advantage of the present invention lies in the fact that the command signals used are a function of the phase of the command voltage relative to the line voltage and not of its amplitude: this makes the system less sensitive to disturbance.

This detail is very important for applications in industry. In order further to improve this characteristic, digital integrators are also provided. Clearly, an expert in the art may make numerous variations to the method and apparatus for the transmission of commands, particularly to motor-driven transport means and principally to automatic carriages on rails for the overhead transport of materials, which is the subject of the present invention, without thereby departing from the scope of the novel principles of the inventive idea.

Among these possible variations may be mentioned the possibility of using the power bus-bars themselves for sending the coded command signals.

Alternatively, mention may be made of the use of the signal coding processor of the present invention for commanding different operations, not only those relating to overhead self-propelled carriages or automatically guided vehicles on the ground, but generally for the sending of a plurality of signals on a single conductor.

What is claimed is:

1. A system for the transmission of a plurality of commands to peripheral means, including:

a main station that generates and sends command signals through a single conductor to the peripheral means which house on-board circuits for receiving and handling the command signals, wherein said plurality of commands is obtained by means of a coded signal formed from a sine wave; and electrical supply conductors which provide an electrical supply to the peripheral means and a conductor connected to earth, for constituting a return path for said command signals, wherein said single conductor is supplementary to said electrical supply and return path conductors; and wherein the sine wave is formed from the mains voltage of the electrical supply.

2. A system for the transmission of a plurality of commands, according to claim 1, wherein said sine wve has a period equal to or one-half of a period of said mains voltage dependent on which of said commands is being sent.

3. A system for the transmission of a plurality of commands, according to claim 1, wherein circuits are provided on the peripheral means for detecting operational anomalies and sending indications of the irregular operating conditions of the peripheral means to the main station through a signal coding circuit and an auxiliary conductor.

4. A system for the transmission of a plurality of commands, according to claim 1, wherein said coded signal comprises a combination of sinusoidal half-waves formed from the mains voltage.

5. A system for the transmission of a plurality of commands, according to claim 4, including phase-changing means for generating from the mains voltage at least two sequences of half-waves which are out of phase by 180° with respect to each other.

6. A system for the transmission of a plurality of commands, according to claim 4, including rectifier means for generating from the mains voltage at least two sequences of half-waves with opposite polarities.

7. A system for the transmission of a plurality of commands, according to claim 1 including means for the switching and manual control of the operation of the peripheral means.

8. A system for the transmission of a plurality of commands, according to claim 1 including means for displaying visually the state of operation of the peripheral means.

9. A system for the transmission of a plurality of commands, according to claim 5, wherein combining means are provided for generating the coded signal from at least two of the sequences.

10. A system for the transmission of a plurality of commands, according to claim 9, wherein said combining means are located in the main station and produce eight different command signals from two of the sequences of half-waves with out-of-phase phases and from two of the sequences of half-waves with opposite polarities.

11. A system for the transmission of a plurality of commands, according to claim 9, wherein said combining means are also located on the peripheral means.

12. A system for the transmission of a plurality of commands, according to claim 9, wherein the combining means include controlled switches and adding circuits.

13. A system for the transmission of a plurality of commands, according to claim 6, wherein combining means are provided for generating the coded signal from at least two of the sequences.

14. A system for the transmission of a plurality of commands, according to claim 13, wherein said combining means are located in the main station and produce eight different command signals from two of the sequences of half-waves with out-of-phase phases and from two of the sequences of half-waves with opposite polarities.

15. A system for the transmission of a plurality of commands, according to claim 13, wherein said combining means are also located on the peripheral means.

16. A system for the transmission of a plurality of commands, according to claim 13, wherein the combining means include controlled switches and adding circuits.

17. A system for the transmission of a plurality of commands, according to claim 1 wherein decoding circuits are provided on the peripheral means for decoding the coded signal, including a circuit for generating synchronism signals and a sampling circuit, controlled by said synchronism signals, said generating circuit and sampling circuit being able to reconstitute the sequences of out-of-phase half-waves and half-waves with opposite polarities in order to form command signals to be sent to a control unit for the peripheral means.

18. A system for the transmission of a plurality of commands, according to claim 17, wherein the synchronism signal generating circuit comprises a transformer with a balanced output and two rectifier circuits.

19. A system for the transmission of a plurality of commands, according to claim 18, wherein the mains voltage is supplied to an input of the synchronism signal generating circuit and its output supplies a synchronism input of the sampling circuit.

20. A system for the transmission of a plurality of commands, according to claim 17, wherein the sampling circuit includes rectifier circuits receiving said command signals, squaring circuits receiving outputs of said rectifier circuits and logic gates of the AND or NAND type receiving outputs of said squaring circuits and said synchronism signals.

21. A system for the transmission of a plurality of commands, according to claim 20, wherein the mains voltage is supplied to an input of the synchronism signal generating circuit and its output supplies a synchronism input of the sampling circuit.

22. A system for the transmission of a plurality of commands, according to claim 20, wherein the coded signal on said single conductor is supplied to the signal inputs of the sampling circuit.

23. A system for the transmission of a plurality of commands, according to claim 17, wherein the decoding circuits include an integrator circuit for confirming the command signals.

* * * * *